Patented Oct. 15, 1940

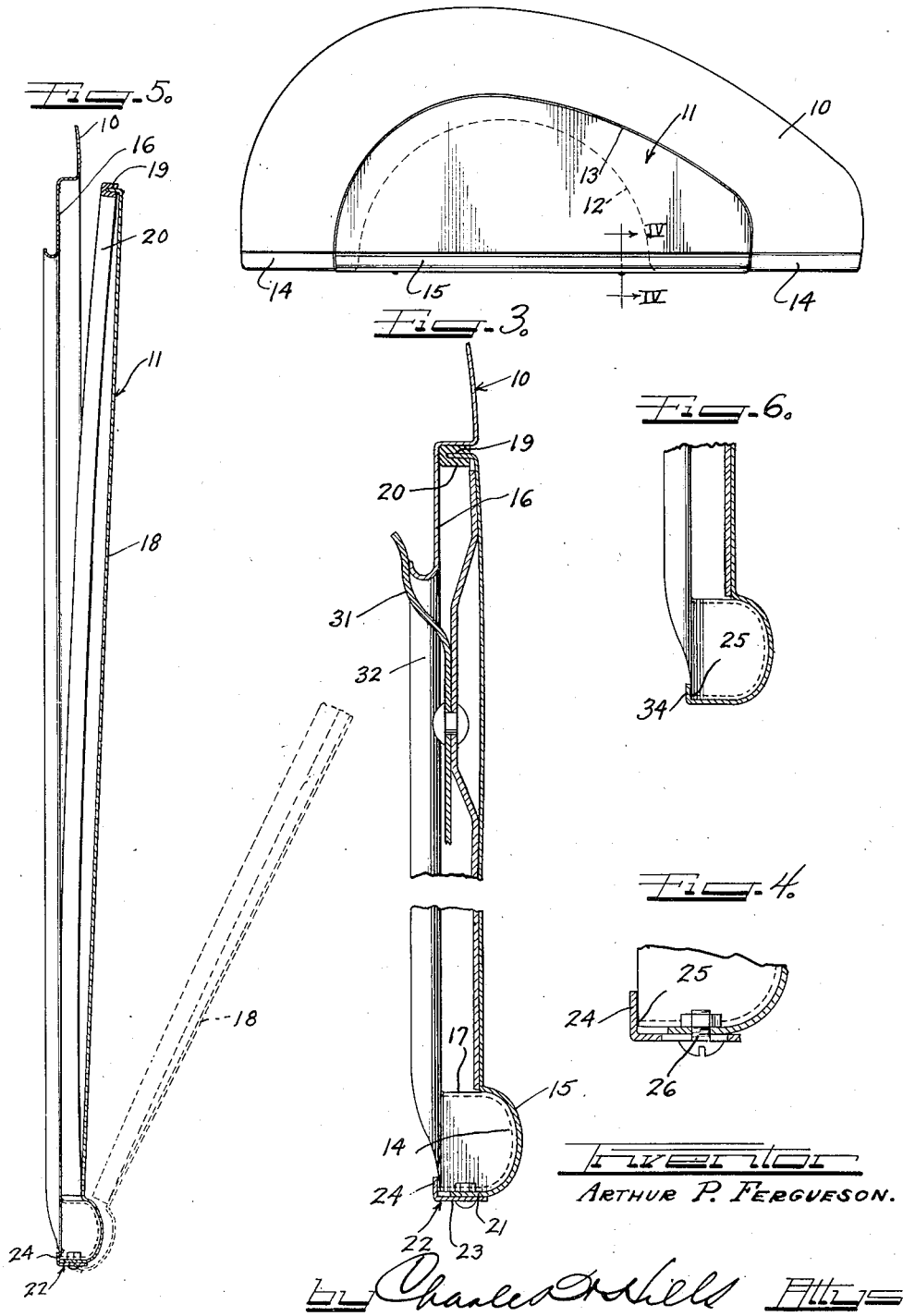

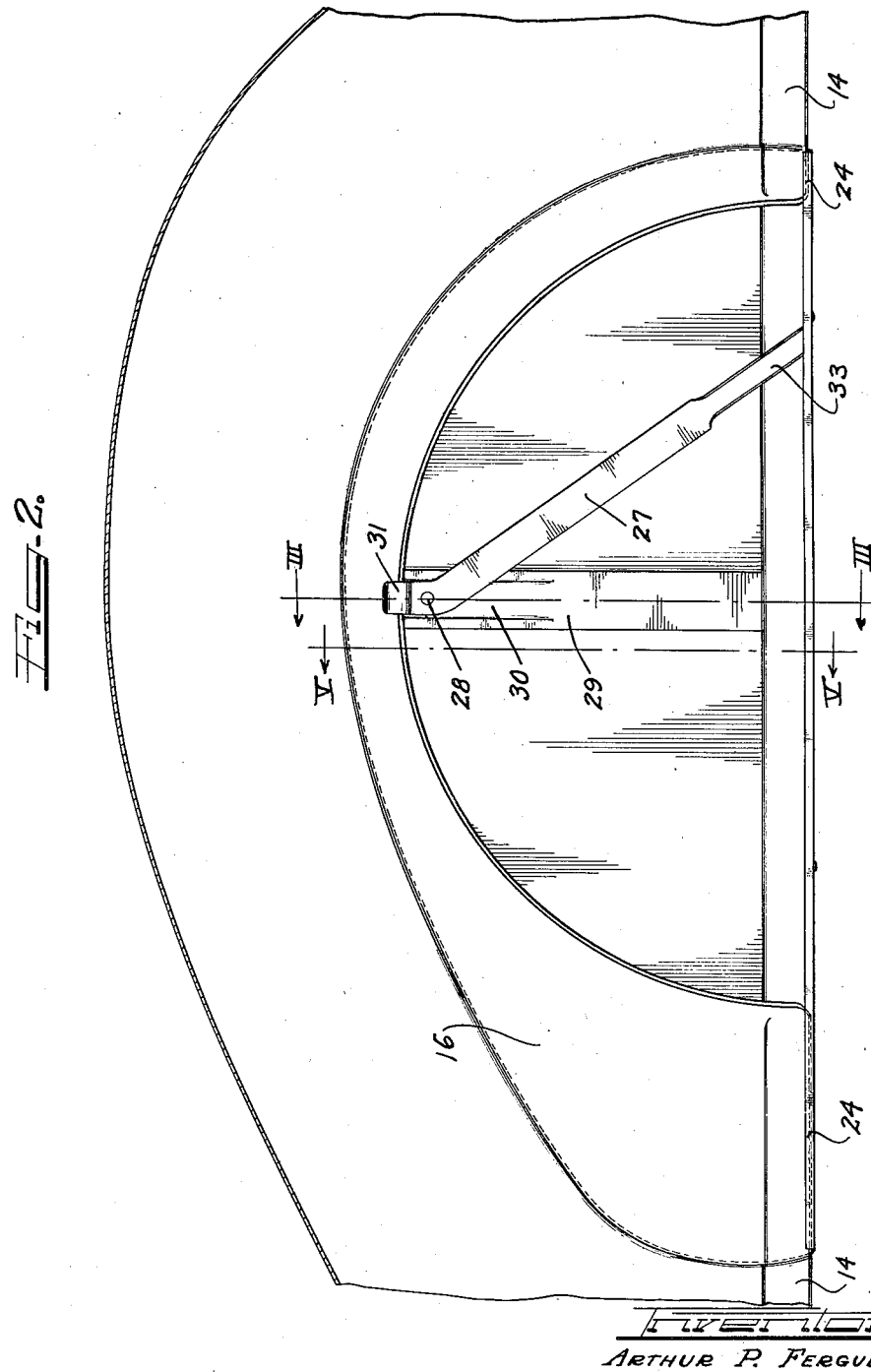

2,217,838

UNITED STATES PATENT OFFICE 2,217,838

FENDER SHIELD AND ASSEMBLY

Arthur P. Fergueson, Detroit, Mich., assignor to Houdaille-Hershey Corporation, Detroit, Mich., a corporation of Michigan Application December 24, 1938, Serial No. 247,580

12 Claims. (Cl. 280—153)

This invention relates to fender shields and fender shield assemblies, and more particularly to a fender shield assembly of the type in which a fender shield is progressively flexed or wrapped into place as it is mounted on the vehicle fender. This invention also relates to a novel supporting and mounting means for detachably securing the fender shield in desired position on a vehicle fender. Furthermore, as the term "fender" shall hereinafter be employed, it refers to any form of wheel fender in its broad sense, whether such fender be separate from the vehicle body part, partially separate from the vehicle body, or actually an integral part of the vehicle body, and whether or not it projects outwardly away from the principal body portion of the vehicle.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an unattractive outward appearance, detachable fender shields have been employed to substantially cover this opening. As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel.

It is an object of the present invention to provide a novel fender and fender shield assembly.

It is a further object of this invention to provide a novel fender shield including supporting and latching means which is economical to manufacture and which is rugged and reliable in use.

It is a still further object of this invention to provide a novel combination of fender shield and fender.

Another and further object of this invention is to provide a novel fender and fender shield assembly in which the fender shield is supported on a molding or inturned portion of the fender.

Another and still further object of this invention is to provide a novel combination of fender and fender shield in which the fender is provided with a recessed portion adjacent the wheel access opening into which the fender shield fits, thereby providing a substantially flush fitting of the fender shield on the vehicle fender.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a fender shield and fender assembly illustrating one embodiment of the present invention;

Figure 2 is an enlarged rear elevational view of the fender and fender shield assembly shown in Figure 1;

Figure 3 is a cross-sectional view of the fender and fender shield assembly taken along line III—III of Figure 2;

Figure 4 is an enlarged fragmentary sectional view of the adjustable clamping bracket or flange at the lower edge of the fender shield;

Figure 5 is a cross-sectional view of the fender shield and fender assembly taken along the line V—V of Figure 5; and, Figure 6 is a fragmentary elevational view of the rear portion of a modified form of fender shield.

Referring now to the various figures of the drawings, there is illustrated therein a vehicle fender 10 of the high-crown type which is commonly employed on motor vehicles of the present day. Mounted on and detachably secured to the fender 10 is a fender shield 11 which is preferably streamlined in shape and designed to harmonize with the vehicle fender 10. The vehicle fender 10 is provided with a substantially semicircular opening 12 in its outer depending side wall which affords access to the vehicle wheel and permits removal of the wheel (not shown) therethrough. As shown in the drawings, the outer curved edge 13 of the fender shield 11 is not designed nor shaped to conform to the shape of the wheel access opening 12 of the fender 10.

The fender 10 is also shown as being provided with a molding 14 along the lower base edges thereof which is preferably integral with the material forming the main body of the fender 10. The fender shield 11 is provided with a similar molding 15 along its lower edge which will harmonize with and give the appearance of being a substantially continuous molding with the molding 14 of the fender 10.

In order to permit the fender shield 11 to be mounted so that its outer face is flush with the outer face of the fender 10, the fender 10 is recessed as at 16. (See Figures 2 and 5 of the drawings.) This recessed panel portion 16 is shaped and dimensioned to snugly receive the fender shield 11. It will be observed that the molding 14 which extends along the base edges of the fender 10 continues along the recessed portion 16, the only difference being that the upper edge 17 of the molding 14 extends further back in a rearwardly projecting ledge. As will presently be pointed out in detail, that portion of the molding 14 which extends along the lower edges of the recessed portion 16 is taken advantage of to provide a support for the fender shield 11.

The fender shield 11 comprises a panel portion 18 which is provided with a rearwardly bent flange 19 around its curved edge 13. A strip of cushioning material, such for example as rubber, is secured over the end of the rearwardly bent flange 19, and is preferably of such shape and dimension that it will just sit within the recessed portion 16 of the fender 10, as may be seen best in Figure 3.

The molding 15, which is formed along the lower edge of the fender shield 11, is shaped to be nested over the molding 14 of the fender 10. The lower edge of the molding 15 merges into a rearwardly extending flange 21 which extends beneath the base of the fender 10. Adjustably secured to the rearwardly extending flange 21 is an adjustable angle bar or bracket 22. One leg 23 of the angle bar overlaps the flange 21 while the other leg 24 extends upwardly behind the rear edge 25 of the fender 10. The angle bar or bracket 22 preferably extends entirely across the fender shield, as may be seen best in Figure 2, and is adjustably mounted by means of a bolt and slot arrangement 26, as is shown in Figure 4 of the drawings. The upstanding leg 24 of the bracket 22 should be so positioned that it snugly and tightly engages the rear edge 25 of the fender 10 when the molding 15 is in snug nesting relationship with the molding 14. It will thus be understood that the angle bar or bracket 22 in conjunction with the molding 15 provides a means for preventing lateral displacement of the lower edge of the fender shield 11 with respect to the fender 10.

The latching means for holding the top of the fender shield 11 in place on the fender 10 comprises a latching arm 27, which is pivotally mounted as at 28 on a reinforcing bracket 29 which extends substantially vertically across the rear face of the panel 18 of the fender shield 11 and is welded or otherwise suitably secured thereto. As is clearly shown in Figures 2 and 3 of the drawings, the reinforcing bracket 29 includes a raised or pressed-out portion 30 in the nature of a rib which carries the latching arm 27.

The latching arm 27 includes an outwardly and upwardly curved latching portion 31 which is arranged to engage the underturned marginal portion 32 which defines the edge 12 of the fender 10. The latching portion 31 is so shaped that as it is angled into position behind the underturned portion 32, the cushioning bead 20 is cammed into tight engagement with the fender 10. The opposite end of the latching arm 27 is shaped to provide a handle 33 which may be grasped by the operator by reaching under the fender shield 11. The lower end of the handle 33 is arranged to be positioned inside of the upstanding arm 24 of the angle bar or bracket 22, the arm preferably being sufficiently resilient to maintain a tight contact at that point and prevent rattling.

As is shown in Figure 5, the fender shield 11 is shaped so that in an unflexed position it is not possible to seat the fender shield 11 on the fender 10. More specifically, the fender shield 11 and particularly the curved edge 13 of the fender shield 11 flares slightly outwardly from its two lower corners away from the fender 10. It is thus necessary, as the fender shield 11 is moved into position on the fender 10, to progressively flex or wrap the fender shield upwardly from its two lower corners to the top, where it is clamped into place by the latching arm 27. It has been found that a fender shield constructed and mounted in this manner provides a much tighter fit with the fender upon which it is mounted and is less subject to vibrations and rattling.

The manner in which the fender shield 11 is mounted on the fender 10 may be best understood by an inspection of Figure 5. The upstanding arm 24 of the angle bar or bracket 22 is hooked behind the lower inner edge 25 of the fender 10 as is shown by the dotted lines in Figure 5. The fender shield 11 is thereafter rocked in a counterclockwise direction as viewed in Figure 5 until the molding 15 of the fender shield 11 is snugly nested over the molding 14 of the fender 10, as is shown by the full lines in Figure 5. The counterclockwise movement of the upper portion of the fender shield 11 is thereafter continued, thereby causing a progressive flexing or wrapping of the curved edge 13 of the fender 11 from its two lower corners upwardly around its curved edge towards the top of the fender shield. The top of the fender shield is pulled into tight engagement with the fender 10 by rotating the latching arm 27 into engagement with the underturned portion 32 of the fender 10. The lower end of the latching arm 27 is then snapped over the upstanding arm 24 of the angle bar 22 and dropped into place therebehind. To remove the fender shield, it is simply necessary to rotate the latching arm 27 out of engagement with the underturned portion 32 of the fender 10, and the fender shield may then be lifted off of the fender 10.

In Figure 6 of the drawings I have illustrated a modified form of the present invention wherein the angle bar or bracket is eliminated and in its place the rearward edge portion 34 of the rearwardly extending flange 21 of the fender shield 11 is bent upwardly to engage the rear edge 25 of the lower edge of the fender 10. While this form of the invention provides a more economical fender shield to manufacture, it of course does not have the advantage of an adjustable flange or angle bar such as that described in connection with the preferred embodiment of my invention. However, where the fender shield is being manufactured for a vehicle which itself is manufactured to close tolerances, it has been found that a fender shield having a lower edge such as that illustrated in Figure 6 may be employed with extremely good results.

While I have shown particular embodiments of my invention, it will, of course, be understood, that I do not wish to be limited thereto, since many modifications may be made, and I, therefore, contemplate by the appended claims to cover all such modifications as fall within the true spirit and scope of my invention.

I claim as my invention:

1. In a fender and fender shield assembly the combination comprising a fender having a molding along at least a portion of its lower edge, and a fender shield mounted on said fender having a complementary molding nested over said fender molding which supports said shield on said fender, said shield also having means thereon for restraining outward movement thereof away from said fender.

2. In a fender and fender shield assembly the combination comprising a fender having a substantially semicircular wheel access opening therein and having a recessed portion of different peripheral shape than said opening adjacent thereto, said recessed portion having a molding along its lower edge, and a fender shield mounted on said fender, said shield having means seated on said molding for vertically supporting said shield on said fender, and additional means for holding said shield tight against said fender in a transverse direction.

3. The combination comprising a vehicle body part having a downwardly depending outer wall portion for overhanging a vehicle wheel and having a wheel access opening therein, the lower edge of said wall portion being provided with an outer bulging rib like portion, and a shield for disposition on said depending wall portion over said opening, said shield having means thereon for engaging said rib like portion whereby said shield is seated and supported thereon, and means on said shield extending beneath the lower edge of said depending wall portion and engaging a rear part of said wall portion, and latching means on said shield spaced from said rib like portion engaging said depending wall portion for holding said shield in tight cooperation therewith.

4. In a fender and fender shield assembly the combination comprising a fender having a recessed panel portion provided with a wheel access opening therein, the lower edge of said panel portion being provided with an outwardly bulging rib like portion, and a fender shield mounted on said fender over said opening and being substantially coextensive with said recessed panel portion, the lower edge of said fender shield having an outwardly bulging rib like portion complementary to said rib like portion of said fender and nested thereover, adjustable bracket means secured to said fender shield extending beneath the lower edge of said fender and engaging a rear part of said fender to retain said rib like portions in tight nested engagement when said shield is disposed in mounted position on said fender, and cam operated latching means on said shield spaced from said rib like portions for holding the top part of said fender shield in tight engagement with said fender.

5. As an article of manufacture, a fender shield for disposition on a vehicle fender over the wheel access opening thereof, said fender shield being arranged to be progressively flexed into place on the fender from its two lower corners towards the top, the lower edge of said fender shield being bent convexly outwardly and then rearwardly, and an angle bar adjustably mounted along the lower edge of said fender below said convex portion, one leg of said angle bar being arranged to extend upwardly behind and in tight engagement with said fender when said shield is mounted thereon, and means on said shield for cooperating with said fender to retain the upper portion of said shield in place.

6. As an article of manufacture, a fender shield for disposition on a vehicle fender over the wheel access opening thereof, said fender shield being arranged to be progressively flexed into place on the fender from its two lower corners towards the top, the lower edge of said fender shield being bent convexly outwardly and then rearwardly and terminating in an upwardly turned integral flange arranged to retain the lower part of said fender shield in tight engagement with said fender when said shield is mounted thereon, and means on said shield for cooperating with said fender to retain the upper portion of said shield in place.

7. As an article of manufacture, a fender shield having a principal panel portion for substantially covering a wheel access opening of a vehicle fender and including a curved edge for engagement with said vehicle fender and a substantially straight lower edge, the lower margin portion of said shield being curved convexly outwardly and then rearwardly and terminating in an axially rearwardly extending edge portion arranged for disposition beneath a portion of said fender when said shield is mounted thereon, means engageable with said fender for retaining said convexly curved portion in desired position against said fender, and a latching lever rotatably mounted on the rear of said fender shield and extending across the rear face of said panel portion, said latching lever being shaped and arranged to engage said fender and retain said shield in tight engagement therewith.

8. The combination comprising a fender having a downwardly depending outer wall portion, said depending wall portion having a recessed panel portion formed therein and integrally connected to the principal body portion of said downwardly depending wall portion by a shoulder, and a fender shield having an inturned marginal flange thereon substantially coextensive with said recessed panel portion, said inturned marginal flange having a cushioning bead mounted thereon and arranged to engage said recessed panel portion and said shoulder of said fender, said panel portion and said fender shield having complementary recessed rib like portions for vertically supporting said shield on said fender, and means acting in a lateral direction for holding said fender shield in tight engagement against said fender.

9. In a fender and fender shield assembly, the combination comprising a fender having a moulding on the outer face thereof, and a fender shield mounted on said fender having a complementary moulding nested over said fender moulding which supports said shield on said fender, said shield also having means thereon for restraining outward movement thereof away from said fender.

10. In a fender and fender shield assembly, the combination comprising a fender of thin gauge sheet material having a downwardly depending outer wall portion for overhanging a vehicle wheel and provided with a wheel access opening therein, said wall portion surrounding said opening being offset rearwardly to provide a recessed panel portion including a substantially vertical wall portion spaced outwardly from the wheel, and a fender shield mounted on said fender over said recessed panel portion and said opening, said shield having a rearwardly extending peripheral flange seated against said recessed panel portion, said shield being substantially co-extensive with said panel portion and said peripheral flange being dimensioned to provide substantially a flush fit of the outer face of the shield with the outer face of the fender, said vertical wall portion being adapted to cooperate with fender shield retaining means.

11. The combination comprising a vehicle body part having a downwardly depending outer wall portion formed of thin gauge sheet material and arranged to overhang a vehicle wheel, said wall portion having a wheel access opening therein and a recessed panel portion surrounding said opening and including a substantially vertical wall portion spaced outwardly from the wheel, the outer peripheral boundary of said panel portion being defined by a rearwardly extending shoulder, and a wheel shield formed of thin gauge sheet material mounted on said body part over said recessed panel portion and said opening, said shield having rearwardly projecting means seated against said recessed panel portion and substantially co-extensive with said shoulder, said vertical wall portion being adapted to cooperate with wheel shield retaining means.

12. The combination comprising a vehicle body part having a downwardly depending outer wall portion formed of thin gauge sheet material arranged to overhang the vehicle wheel, said wall portion having an opening therethrough to afford access to the vehicle wheel, said wall portion having a recessed panel adjacent and surrounding said opening, said panel including a substantially vertical wall portion spaced outwardly from the wheel and being connected to the principal wall portion by an integral shoulder and the marginal edge of said panel which defines said opening being bent rearwardly to provide a reinforced edge, and a shield mounted on said panel covering said opening and detachably secured to said vehicle body part, said vertical wall portion being adapted to cooperate with shield retaining means.

ARTHUR P. FERGUESON.